No. 612,140. Patented Oct. 11, 1898.
J. RILING.
GLASS PRESS.
(Application filed Mar. 3, 1898.)
(No Model.) 4 Sheets—Sheet 3.
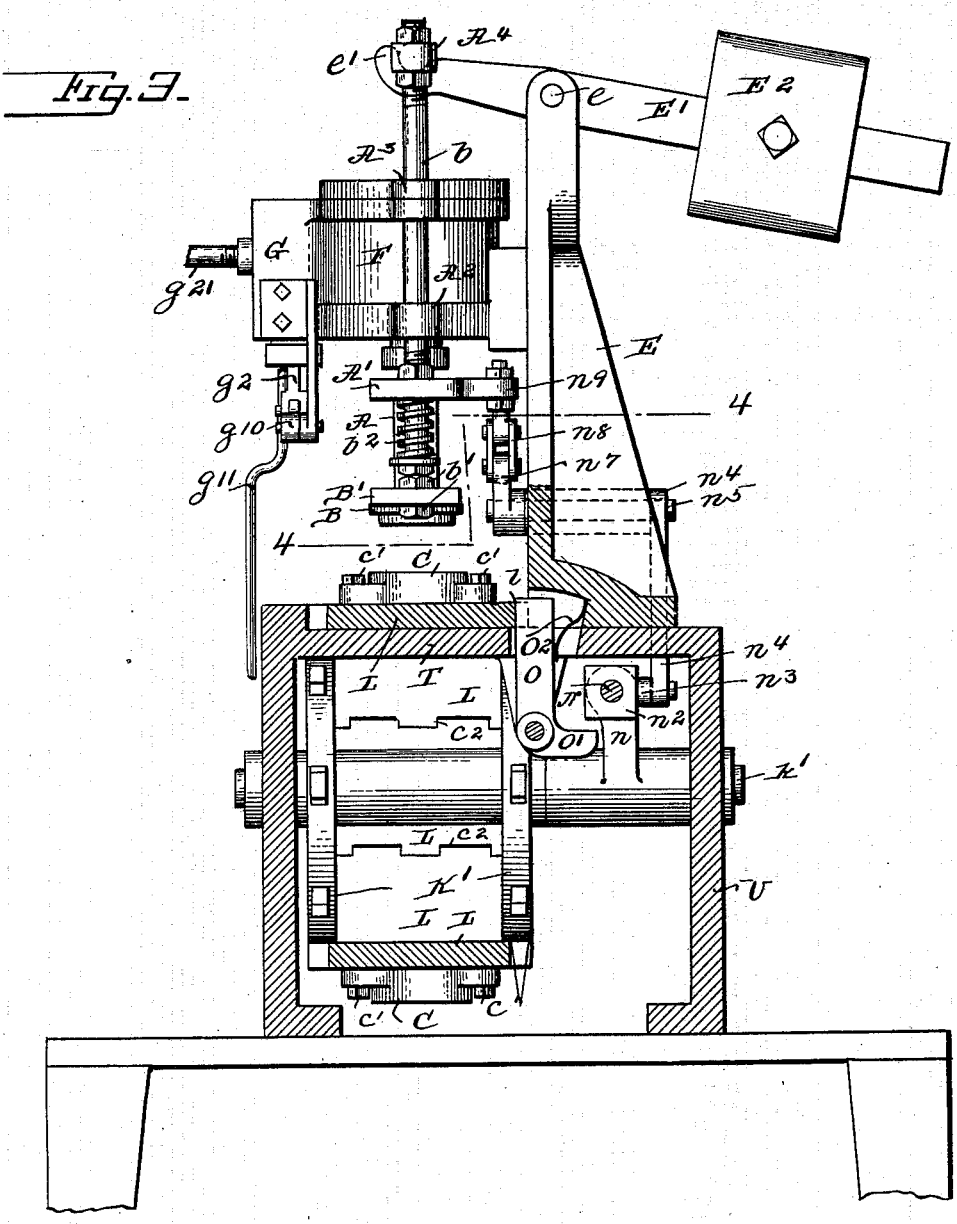
Witnesses.
Jesse B. Heller,
M. F. Ellis
Inventor.
Joseph Riling
Harding & Harding
Attorneys

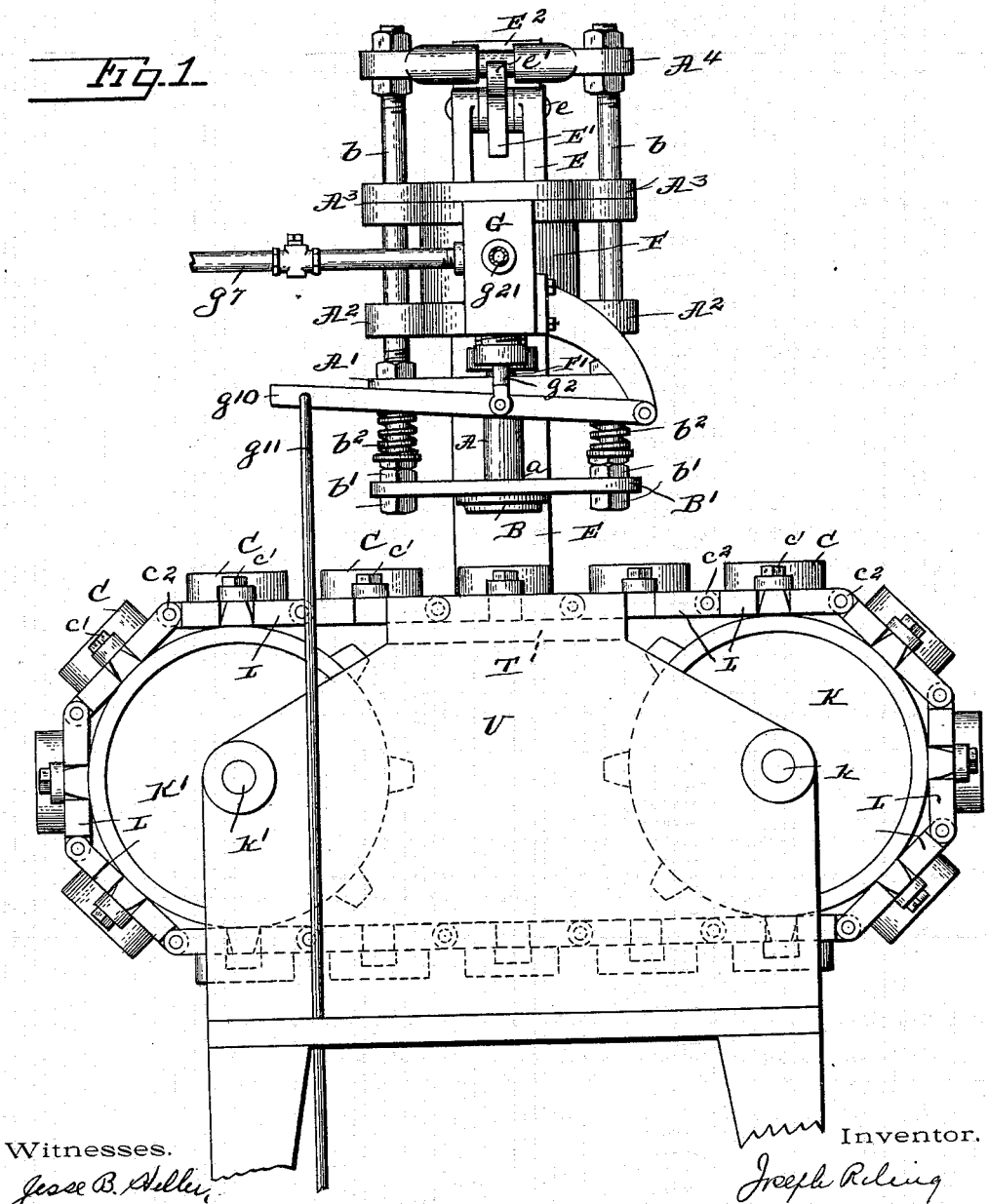

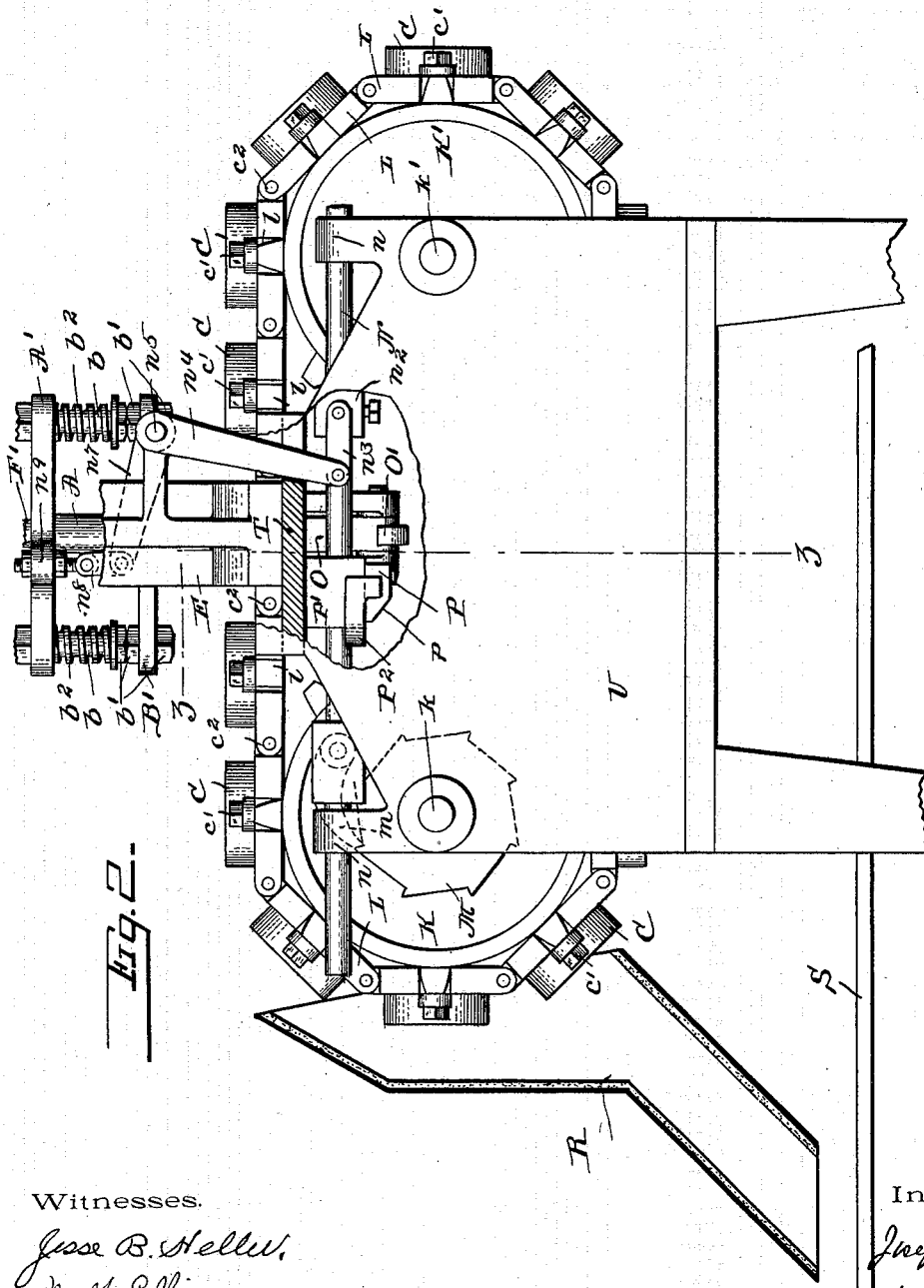

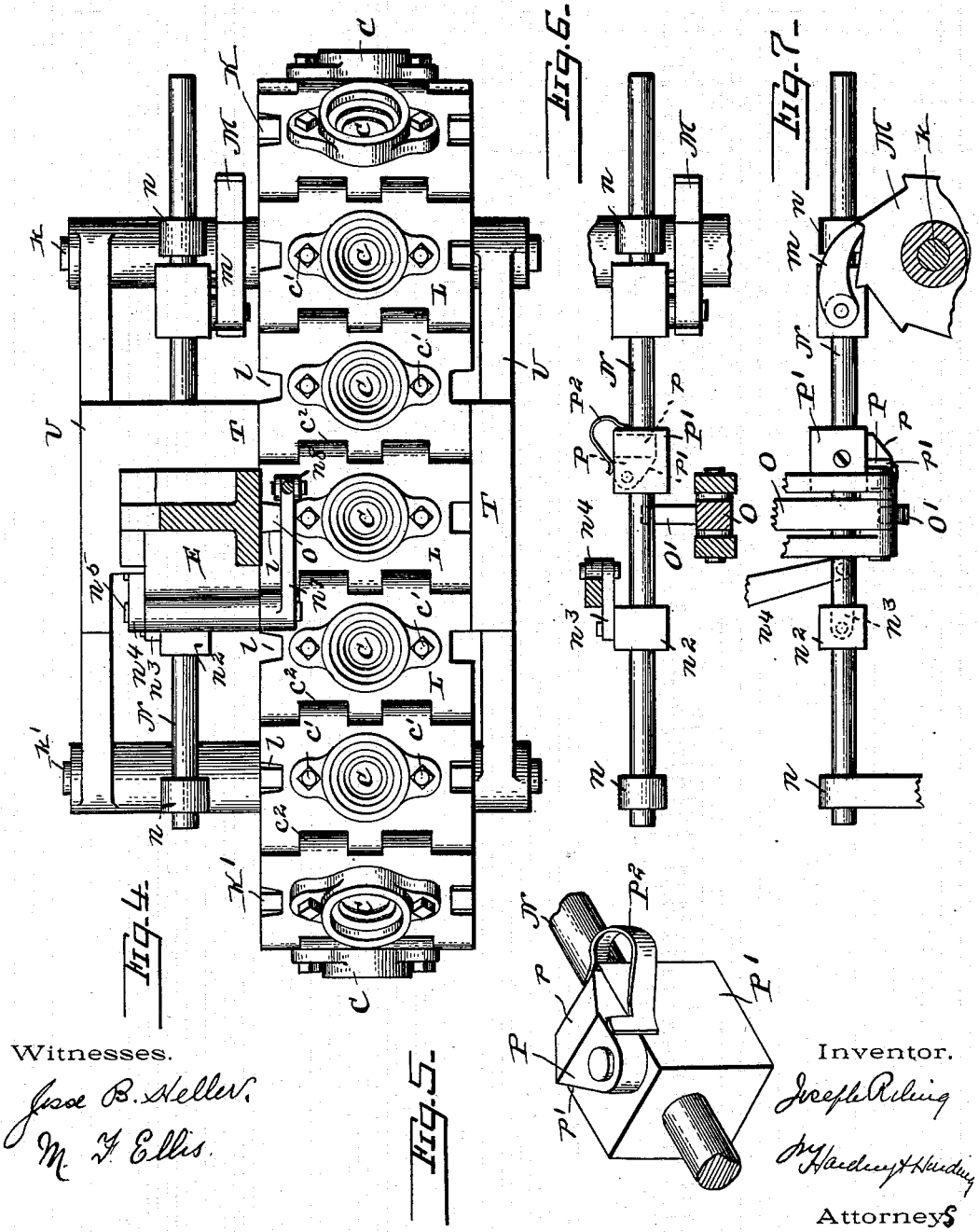

UNITED STATES PATENT OFFICE.

JOSEPH RILING, OF PHILADELPHIA, PENNSYLVANIA, ASSIGNOR TO SALMON B. ROWLEY, OF SAME PLACE.

GLASS-PRESS.

SPECIFICATION forming part of Letters Patent No. 612,140, dated October 11, 1898.

Application filed March 3, 1898. Serial No. 672,353. (No model.)

*To all whom it may concern:*

Be it known that I, JOSEPH RILING, a citizen of the United States, residing at Philadelphia, county of Philadelphia, and State of Pennsylvania, have invented a new and useful Improvement in Glass-Presses, of which the following is a full, clear, and exact description, reference being had to the accompanying drawings, which form a part of this specification.

My invention has for its object to construct an apparatus for the casting of glass articles which by the manipulation of a single controlling device by the operator will bring a plurality of molds successively under the plunger-die, operate the plunger-die to form the glass articles, and successively withdraw the articles so formed from beneath the plunger-die and convey them to the annealing-oven.

The invention consists in a plunger-die and mechanism for reciprocating the same, combined with a traveling conveying apparatus divided into sections, each section carrying a mold or female die, the several sections being adapted to be brought directly successively under the male die and follower, and thence to travel forward and by successive upsetting actions of the several sections eject the molded glass article.

In the drawings, Figure 1 is a front view. Fig. 2 is a partial rear elevation. Fig. 3 is a sectional view on the line 3 3, Fig. 2. Fig. 4 is a sectional view on the line 4 4 of Fig. 3. Fig. 5 is an inverted perspective of the cam for operating the locking-lever. Fig. 6 is a detail plan view of the shifting and locking mechanism. Fig. 7 is a side elevation of the same.

I will first describe briefly the press mechanism for actuating the plunger-die A and follower B.

U is the frame of the machine.

A is the plunger, carrying the die $a$ and the follower B. The rods $b\ b$ extend through orifices in the follower-plate B', so that the follower-plate B' is secured upon said rods by the nuts $b'\ b'$ on the lower end of said rods. The plunger is secured to the cross-head A', and between the follower-plate B' and cross-head A' and surrounding the rods $b\ b$ are strong spiral springs $b^2\ b^2$. The rods $b\ b$ extend beyond the cross-head A', through the fixed guides $A^2\ A^3$, and are connected together by the cross-head $A^4$.

Secured to the frame of the machine is the frame E, supporting the shaft $e$, to which is secured the counterbalance-rod E', one end of which has the hook $e'$ engaging the cross-head $A^4$, and has upon the other the counterbalance-weight $E^2$.

F is a cylinder having the piston-rod F' connected to the cross-head A' and the piston. (Not shown.)

G is a valve-chamber having a piston connected to the rod $g^2$.

$g^{21}$ is an inlet to the valve-chamber from an air-compressor. (Not shown.)

$g^7$ is an exhaust-passage from the valve-chamber. The rod $g^2$ is connected to a lever $g^{10}$, which is connected to a foot-treadle (not shown) by means of the link $g^{11}$.

The valve-chamber and piston-chamber are suitably connected by air-passages, so that the reciprocation of the valve-piston causes a corresponding reciprocation of the piston—that is, when the operator forces down the treadle the valve is operated to admit air above the piston, and when his foot is removed it returns the valve to its original position, admitting air beneath the piston. I have not shown these air-passages, as they constitute no part of my invention.

When the treadle is depressed to admit air above the piston, the piston moves downward, forcing the cross-head A', and with it the plunger A, and, through the springs $b^2\ b^2$, the follower B. The follower reaches its ultimate position before the plunger strikes the glass in one of the dies C. The dies C are brought successively beneath the plunger and supported rigidly in that position in a manner to be hereinafter particularly described. The further movement of the piston moves the plunger A farther downward, holding the follower fixed by the spring-pressure. The downward movement of the plunger continues until it has squeezed the molten glass out to fill the combined mold, and when this occurs the piston ceases its downward movement. When the operator releases the treadle, the valve is reversed, thus admitting air beneath the piston. This lifts the piston and, through the medium of rods $b$ $b$, the plunger and follower. The counterweight $E^2$ accelerates this upward movement.

I provide the following mechanism for carrying and supporting the several female dies:

K K' are two octagonal-shaped sprocket-wheels or pulleys mounted on the shafts $k$ $k'$, the shafts being supported in bearings, so as to be freely revoluble. Around said sprocket-wheels extends an endless chain composed of the hinged sections L L, each section being of a size corresponding to one of the flat surfaces of wheels K K'. These sections consist of blocks, and each block sustains a mold C, which is bolted to the section by means of bolts $c'$. The blocks are hinged or pivoted together by means of hinges $c^2$. They are shown in plan in Fig. 4.

I provide the following mechanism for turning the wheel K so that the sections may be brought successively under the plunger and held there until the pressing or molding operation is completed:

M is a ratchet-wheel on the shaft $k$. This ratchet-wheel has detents equal in number to the flat surfaces on the wheel K. This ratchet-wheel is operated by the pawl $m$, pivoted to the horizontal rod N and held against the ratchet-wheel by means of gravity. This rod N is adapted to slide in bearings $n$ on the frame of the machine. Secured to the rod N is the sliding block $n^2$.

$n^3$ is a link connected to the sliding block $n^2$, and the other shaft $n^5$, which rests in a bearing on the frame E, is supported on the frame of the machine. Connected to the other end of the rock-shaft is the crank $n^7$, which in turn is connected at its opposite end to the link $n^8$, which link is connected to the arm $n^9$, secured to the cross-head A'.

As the cross-head A' is depressed in the downward movement of the plunger-die the rod N is caused by the mechanism just described to slide from right to left, and the pawl $m$ slides from the position illustrated over the long face of one of the detents until it drops into position to engage the next succeeding tooth. As the cross-head A' is elevated in the upward movement of the plunger-die the rod N is drawn from left to right, the pawl $m$ engages one of the detents in the ratchet-wheel M, and the wheel K is given a one-eighth revolution, causing the entire series of sections to move forward such a distance that the next succeeding section is brought beneath the plunger-die.

It is necessary that the sections be advanced precisely the same distance each time and that the female dies carried thereby be stopped and held successively in such position beneath the plunger-die that the two dies will be in exact alinement. In order, therefore, to maintain accurate presentation of the female die to the reciprocating plunger-die during the downward movement of the press, I have provided the following mechanism:

Each section L has an inset or notch $l$ in one end. Secured to the frame of the machine is a bell-crank lever one arm O of which normally presses against the end of the adjacent section under the tension of a spring $O^2$ and fits and engages the inset $l$ when the section is moved forward, being pressed therein by the spring $O^2$, and thereby locks the section engaged from moving. The other arm O' of the bell-crank lever is in alinement with a cam P, carried by rod N. By the engagement of this cam with arm O' arm O is withdrawn from engagement with the section, so as to permit the section to advance, as I will now proceed to more fully describe.

Secured to the rod N so as to surround the same is the block P', to the under side of which is pivoted the cam P, the block and cam being shown in inverted perspective in Fig. 5. The under side of this cam has an inclined face $p$, thinnest at its free end. The free end of the cam is widened out, so that the edge of the cam nearest the section L presents an inclined face $p'$. A leaf-spring $P^2$ normally holds the cam P in the position shown, in which position it is in alinement with the cam O' of the bell-crank.

As the sections move from left to right the arm O is held against the adjacent section by the tension of leaf-spring $O^2$ and drops into the inset in the section, as before described, when the section has advanced a sufficient distance to bring its inset immediately opposite arm O, which occurs when the rod N has reached its extreme limit of movement to the right. During the movement of the rod from right to left it is necessary that the engagement of the arm O with the section should be maintained, for during this movement of the rod the pressing operation takes place. Just before the rod reaches its extreme limit of movement to the left the inclined face $p'$ of the cam P engages the end of arm O', but as the engagement is an end thrust the bell-crank does not swing, but the cam itself swings outwardly on its pivot against the action of the spring $P^2$, returning immediately to its normal position as soon as the cam passes beyond the arm O', which occurs just before rod N has been shifted to its extreme position to the left. When the upward movement of the plunger begins, the rod starts to shift from its extreme left position. The sections, however, do not begin to immediately move, as the pawl has passed in its movement from right to left some distance beyond the next succeeding tooth of the ratchet. Before the pawl engages the ratchet the under face $p$ of the cam P strikes the upper edge of arm O', tilting the bell-crank and withdrawing arm O from the notch $l$, immediately after which the pawl engages the ratchet, and the section carrying the mold which has just been in use begins to move from left to right. A slight further movement of the shaft causes the cam to clear the arm O' of the bell-crank, and the arm O under the action of the spring $O^2$ springs forward again toward the section which it has just released; but the notch has passed some distance to the right and the arm O rests successively against the end of said section and against the end of the next adjacent section until the shaft has reached its extreme movement to the right, when, as before described, the last-named section has reached such a position relatively to the arm O that the latter drops into the notch, as before described, and holds the section rigid during the next succeeding pressing operation.

In order that the female die may be held vertically rigid during the pressing operation, a table T is placed beneath the press so that its supporting-surface rests immediately beneath the plunger and so close to the sections that the latter will slide over the table as they advance.

Beneath the wheel K is a chute R, beneath which is a traveling conveyer S, leading to the annealing-oven. As the sections pass over the wheel K the article which has been previously pressed drops from the mold onto the chute, whence it drops onto the conveyer, which transfers the article to the annealing-oven.

Having now fully described my invention, what I claim, and desire to protect by Letters Patent, is—

1. In a glass-press, the combination with a plunger-die, of an endless series of pivoted sections, said sections constituting the mold-supports, pulleys around which said series of sections extends, a ratchet-wheel on one of said pulleys, a pawl coacting with said ratchet-wheel, a rod adapted to slide in bearings to which said pawl is attached, an arm adapted to engage each of said sections successively and hold them rigid, a cam on said rod in alinement with said arm, and mechanism connecting the plunger-die with the rod.

2. In a glass-press, the combination with a plunger-die, of an endless series of pivoted sections, said sections constituting the mold-supports, pulleys around which said series of sections extends, a ratchet-wheel on one of said pulleys, a pawl coacting with said ratchet-wheel, and mechanism for moving said pawl into engagement with said ratchet whereby the pulley is turned to withdraw one mold from beneath the plunger and substitute another mold for the one withdrawn and upset a mold.

3. In a glass-press, the combination with a plunger-die, of an endless series of pivoted sections, said sections constituting the mold-supports, pulleys around which said series of sections extends, a ratchet-wheel on one of said pulleys, a pawl coacting with said ratchet-wheel, an arm adapted to engage each of said sections successively and hold them rigid, and mechanism for successively withdrawing said arm out of engagement with the section and for moving said pawl into engagement with the ratchet.

Signed by me, at Philadelphia, this 31st day of January, 1898.

JOSEPH RILING.

Witnesses:
  M. F. ELLIS,
  H. M. GOODWIN.